United States Patent

[11] 3,603,295

| [72] | Inventor | Norman Shuman<br>1 Tennis Court, Brooklyn, N.Y. 11226 |
|---|---|---|
| [21] | Appl. No. | 18,120 |
| [22] | Filed | Mar. 10, 1970 |
| [45] | Patented | Sept. 7, 1971 |

[54] ANIMAL LEASHES
10 Claims, 6 Drawing Figs.

[52] U.S. Cl. .......................................................... 119/109,
119/106
[51] Int. Cl. ...................................................... A01k 27/00,
A01k 01/06
[50] Field of Search............................................ 119/106,
96, 109, 118

[56] References Cited
UNITED STATES PATENTS

| 2,827,017 | 3/1958 | Ryan ........................... | 119/109 |
| 2,937,023 | 5/1960 | Seymour et al. .............. | 119/109 X |

FOREIGN PATENTS

| 252,086 | 9/1948 | Switzerland .................. | 119/109 |
| 824,417 | 12/1951 | Germany...................... | 119/109 |

Primary Examiner—Aldrich F. Medbery
Attorney—Frank Ledermann

ABSTRACT: A relatively large dog or other animal on a leash of the type commonly available on the market may on occasion pull hard enough to slip the leash from the hand holding it. The instant leash prevents this by including a noose loop encircling the hand or wrist and, attached to the free extremity of the loop, a hand grip adapted to be grasped by the user's fingers.

PATENTED SEP 7 1971 3,603,295
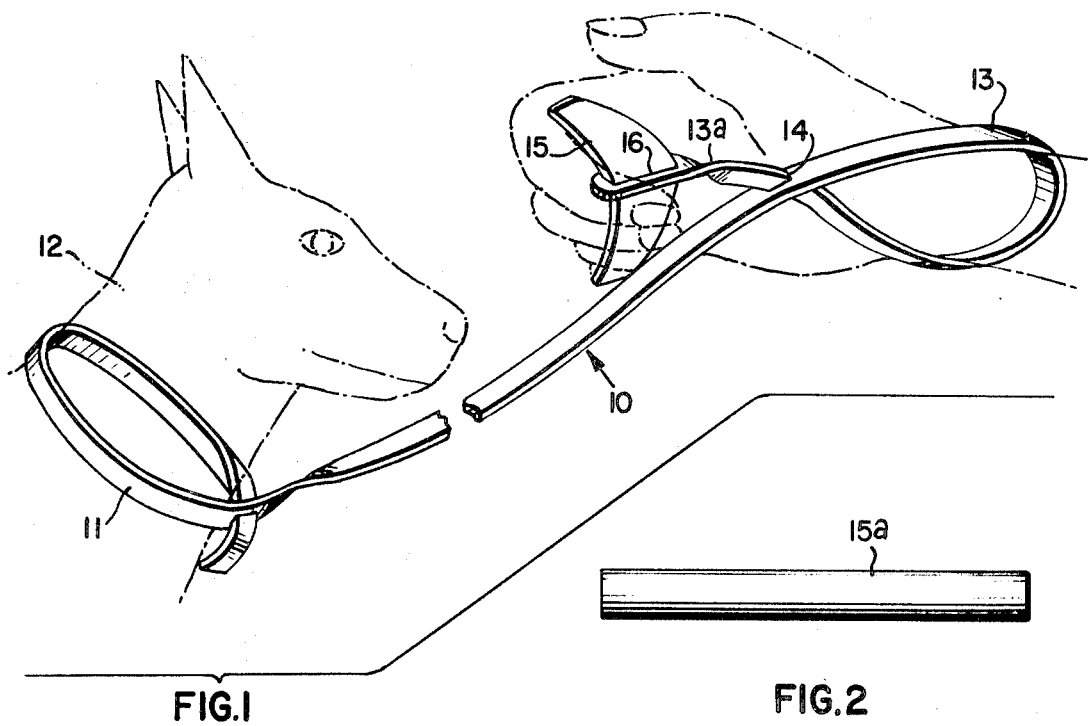
FIG.1
FIG.2
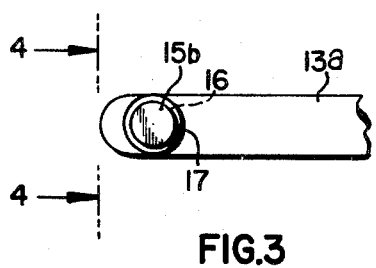
FIG.3
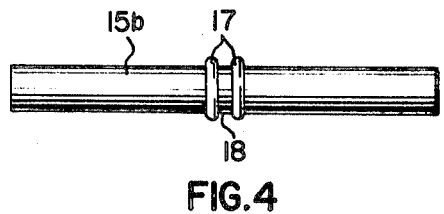
FIG.4
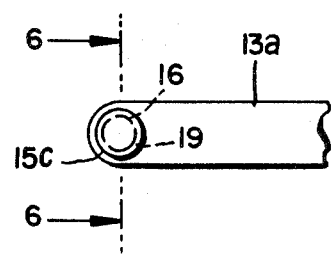
FIG.5
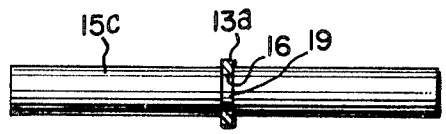
FIG.6
*INVENTOR.*
NORMAN SHUMAN
BY F. Ledermann
ATTORNEY

ANIMAL LEASHES

The present application discloses a number of various constructions, by way of example, whereby the invention may be carried out.

Referring briefly to the drawing, FIG. 1 is an exploded perspective view, partly in phantom, illustrating the manner of applying the invention and one form of hand grip forming a part thereof.

FIG. 2 is an enlarged side view of a modified form of hand grip, per se.

FIG. 3 is an enlarged fragmentary side view of the free end portion of the noose loop of FIG. 1, showing a further modified form of hand grip in end view.

FIG. 4 is a view taken along the line 4—4 of FIG. 3, showing in side view and per se the hand grip of FIG. 3.

FIG. 5 is a view similar to FIG. 3 but showing a still further modified form of hand grip in end view.

FIG. 6 is a sectional view taken on the line 6—6 of FIG. 5, showing in side view the hand grip of FIG. 5 and in section the portion of the leash surrounding the opening therein in which the hand grip registers.

Referring in detail to the drawing, the numeral 10 designates an animal leash which may be made of any suitable material and which may be shaped flat in the manner of a strap as shown or it may obviously be made of any desired cross-sectional configuration throughout its length or through a portion or portions thereof.

At one end of the leash is shown a slip collar or noose 11 encircling the neck 12 of an animal, for example, a dog. Any other type of collar, or a harness, may of course be substituted for the slip collar. The other end of the leash has formed therein a noose loop 13 by providing an opening 14 sufficiently spaced from the extremity of the leash and passing therethrough the free end portion of the loop beyond said opening, in an obvious manner, such free end portion 13a of the leash hence projecting through the said opening.

A hand grip 15, shown as U-shaped or V-shaped in FIG. 1, is attached to the free extremity of the portion 13a in a manner such that it extends transversely with respect to the portion 13a with equal portions of the length thereof extending from opposite sides of the leash. In this case the two arms of the hand grip extend at an angle to each other. More particularly, FIG. 1 shows the hand grip 15 attached by registering its midportion in an opening 16 in the free extremity of the portion 13a.

FIG. 1 shows the loop 13 encircling the wrist of the user although it may of course encircle the hand instead, while fingers of the hand grasp the grip 15. Thus, when the animal pulls hard on the leash it will be impossible for him to cause the free end portion 13a to be pulled through the opening 14 and thus get free.

FIG. 2 shows a modified form of hand grip 15a which may be substituted for the grip 15 of FIG. 1 and which, like the grip 15, is adapted to register in the opening 16 of FIG. 1 and is also adapted to be positioned with substantially equal portions of its length extending from opposite sides of the leash. This form of hand grip, however, may slide to one side or the other of the leash unless it is restrained from doing so by the fingers grasping it. Examples of a grip otherwise like that of FIG. 2 are shown in FIGS. 4 and 6 provided with means for preventing such slippage.

In FIGS. 3 and 4 the hand grip 15b is shown with two spaced circumferential enlarged portions or beads positioned one on either side of the midpoint of the grip and close to the latter, thus, providing a circumferential recess 18 between the beads 17, which recess registers in the opening 16, or, in other words, the surrounding wall of the opening 16 registers in the recess 18.

It is to be noted that since the material of which the leash may be made is flexible and to an extent stretchable and deformable, the opening 16 will accommodate its surrounding wall to the shape of the portion of the hand grip which registers therein. Obviously, however, the opening 16 may be provided with a grommet, not shown.

FIGS. 5 and 6 illustrate a hand grip 15c which is provided with a circumferential groove 19 intermediate its length, about which the surrounding wall of the opening 16 registers.

In FIGS. 2–6 the hand grips are shown having the portions thereof which extend from opposite sides of the leash in mutual alignment, whereas the grip 15 of FIG. 1 has such portions in nonalignment.

Thus a combination leash structure has been disclosed which is secure against being pulled out of the hand, for if the animal pulls hard such pull will first tend to pull the end portion 13a back through the opening 14 but the fingers gripping the hand grip will prevent the completion of such action as well as excessive tightening of the loop 13 about the wrist or hand.

In all cases the hand grip may be made of any suitable material or materials of which wood, plastic, metal and relatively stiff leather may be cite by way of example.

What is claimed and desired to be secured by Letters Patent is as follows:

1. An animal leash having at one end thereof means for securing an animal thereto and, spaced a substantial distance from the other end thereof an opening therein through which the portion of the leash between said other end and said opening passes to form a noose loop adapted to encircle the wrist or hand of the user, the free end portion of the leash which extends through said opening having a hand grip attached thereto adapted to be grasped by the fingers of said hand, said hand grip being positioned transversely with respect to said free end portion of the leash and having portions thereof extending from opposite sides of said free end portion.

2. An animal leash according to claim 1, said portions of said hand grip being in nonalignment with each other.

3. An animal leash according to claim 1, said portions of said hand grip being positioned at an angle to each other.

4. An animal leash according to claim 1, said portions of said hand grip being in mutual alignment.

5. An animal leash having at one end thereof means for securing an animal thereto and, spaced a substantial distance from the other end thereof, a first opening therein through which the portion of the leash between said other end and said first opening passes to form a noose loop adapted to encircle the wrist or hand of the user, the free end portion of the leash which extends beyond said first opening having a second opening therein, and a hand grip received and secured in said second opening and having portions thereof extending from both sides of said free end portion.

6. An animal leash according to claim 5, said portions of said hand grip being in nonalignment with each other.

7. An animal leash according to claim 5, said portions of said hand grip being positioned at an angle to each other.

8. An animal leash according to claim 5, said portions of said hand grip being in mutual alignment.

9. An animal leash according to claim 8, said hand grip having two spaced circumferential beads positioned one on each side of and close to the midpoint of the grip thereby providing between said beads a circumferential recess in which the surrounding wall of said second opening registers.

10. An animal leash according to claim 8, said hand grip having a circumferential groove therein positioned intermediate the length thereof in which the surrounding wall of said second opening registers.